United States Patent
Yamane et al.

(10) Patent No.: US 9,981,342 B2
(45) Date of Patent: May 29, 2018

(54) METHOD FOR ASSEMBLING FUEL SUPPLY PIPE, AND FUEL SUPPLY PIPE ASSEMBLY DEVICE

(71) Applicant: KEYLEX CORPORATION, Hiroshima (JP)

(72) Inventors: Toshimasa Yamane, Hiroshima (JP); Satoshi Tagawa, Hiroshima (JP)

(73) Assignee: KEYLEX CORPORATION, Hiroshima (JP)

( * ) Notice: Subject to any disclaimer, the term of this patent is extended or adjusted under 35 U.S.C. 154(b) by 169 days.

(21) Appl. No.: 14/835,062

(22) Filed: Aug. 25, 2015

(65) Prior Publication Data

US 2015/0360321 A1    Dec. 17, 2015

Related U.S. Application Data

(63) Continuation of application No. PCT/JP2014/000304, filed on Jan. 22, 2014.

(30) Foreign Application Priority Data

Apr. 4, 2013    (JP) .................................. 2013-078722

(51) Int. Cl.
*B23K 26/28*    (2014.01)
*B23K 26/06*    (2014.01)
(Continued)

(52) U.S. Cl.
CPC .......... *B23K 26/0643* (2013.01); *B23K 26/03* (2013.01); *B23K 26/046* (2013.01);
(Continued)

(58) Field of Classification Search
CPC .......... B23K 26/0823; B23K 2210/006; B23K 26/242; B23K 26/282; B23K 26/046;
(Continued)

(56) References Cited

U.S. PATENT DOCUMENTS 3,598,156 A * 8/1971 Ulmer ...................... F16L 9/02
138/140
4,650,952 A * 3/1987 Akeel ................ B23K 26/0884
219/121.74
(Continued)

FOREIGN PATENT DOCUMENTS

JP    11-104865 A    4/1999
JP    2002-370522 A    12/2002
(Continued)

OTHER PUBLICATIONS

Sonobe, Tailored Tube and Method for Manufacturing the Same, Feb. 5, 2004, JPO, 7-page.*
(Continued)

*Primary Examiner* — Dana Ross
*Assistant Examiner* — Kuangyue Chen
(74) *Attorney, Agent, or Firm* — Alston & Bird LLP

(57) ABSTRACT

Provided are a method for assembling a fuel supply pipe of which a joint portion between a pipe body and a short cylindrical member has a high strength and which has high anti-corrosion performance, and a device for assembling the pipe. Specifically, while a laser beam in a defocused state is being emitted to impinge on an end portion of the pipe body that overlaps the short cylindrical member, the pipe body and the short cylindrical member are rotated through one complete turn relative to the laser beam, thereby melting the entire periphery of the end portion. While the laser beam in a defocused state is being emitted to impinge on the melted end portion, the pipe body and the short cylindrical member are rotated through at least one further complete turn, thereby joining by welding the end portion to the outer periphery of the short cylindrical member.

6 Claims, 5 Drawing Sheets

(51) Int. Cl.
  *B23K 26/04* (2014.01)
  *B23K 26/32* (2014.01)
  *B23K 26/08* (2014.01)
  *B23K 26/242* (2014.01)
  *B23K 26/282* (2014.01)
  *B23K 26/046* (2014.01)
  *B23K 26/03* (2006.01)
  *B23K 101/00* (2006.01)
  *B23K 101/06* (2006.01)
  *B23K 101/34* (2006.01)
  *B23K 103/04* (2006.01)
  *B23K 103/08* (2006.01)

(52) U.S. Cl.
  CPC ........ *B23K 26/0823* (2013.01); *B23K 26/242* (2015.10); *B23K 26/282* (2015.10); *B23K 2201/006* (2013.01); *B23K 2201/06* (2013.01); *B23K 2201/34* (2013.01); *B23K 2203/04* (2013.01); *B23K 2203/05* (2015.10); *B23K 2203/08* (2013.01)

(58) Field of Classification Search
  CPC .. B23K 2203/05; B23K 26/03; B23K 26/322; B23K 2201/34; B23K 2203/04; B23K 26/0643
  USPC ........................................ 219/121.64, 121.63
  See application file for complete search history.

(56) References Cited

U.S. PATENT DOCUMENTS

| | | | |
|---|---|---|---|
| 6,221,505 B1 | 4/2001 | Shirai et al. | |
| 2002/0190065 A1 | 12/2002 | Yoshida et al. | |
| 2009/0166337 A1* | 7/2009 | Beattie, Jr. | B23H 7/02 219/69.17 |
| 2011/0284666 A1* | 11/2011 | Sugiyama | B23K 26/0823 239/533.2 |
| 2012/0256563 A1* | 10/2012 | Tsubota | B23K 26/0626 315/501 |
| 2013/0206758 A1 | 8/2013 | Miyagawa et al. | |

FOREIGN PATENT DOCUMENTS

| | | | | |
|---|---|---|---|---|
| JP | 2004-034060 A | | 2/2004 | |
| JP | 2004034060 A | * | 2/2004 | |
| JP | 2009-083406 A | | 4/2009 | |
| JP | 2012-091534 A | | 5/2012 | |
| JP | 2012091534 A | * | 5/2012 | ........... B23K 1/0008 |

OTHER PUBLICATIONS

Miyagawa, Fuel Supply Pipe, May 17, 2012, JPO, 15-page.*
International Searching Authority, International Search Report for International Application No. PCT/JP2014/000304, dated Apr. 8, 2014, 5 pages, Japanese Patent Office, Japan.
International Searching Authority, Written Opinion for International Application No. PCT/JP2014/000304, dated Apr. 8, 2014, 6 pages, Japanese Patent Office, Japan.

* cited by examiner

METHOD FOR ASSEMBLING FUEL SUPPLY PIPE, AND FUEL SUPPLY PIPE ASSEMBLY DEVICE

CROSS-REFERENCE TO RELATED APPLICATION

This application is a continuation of International Application No. PCT/JP2014/000304, filed Jan. 22, 2014, which claims priority to Japanese Patent Application No. 2013-078722, filed Apr. 4, 2013; the entire disclosure of both of which as are hereby incorporated by reference herein.

BACKGROUND

Related Field

The present invention relates to a method for assembling a fuel supply pipe serving as a passage through which a fuel such as gasoline to be supplied to a vehicle fuel tank passes, and a fuel supply pipe assembly device for assembling the fuel supply pipe.

A vehicle includes therein a fuel supply pipe serving as a passage through which a fuel to be supplied to its fuel tank passes. The fuel supply pipe includes a long cylindrical pipe body of which one end is joined to the fuel tank, and a short cylindrical member which is joined to the other end of the pipe body. Generally, the short cylindrical member is welded to the pipe body.

Meanwhile, there has recently been an increasing demand for vehicles to improve their crash safety performance against side collisions, in addition to the crash safety performance against longitudinal collisions, which has conventionally been required. In particular, with respect to a fuel supply pipe which is installed near a side of a vehicle in many cases, more and more importance is attached to the prevention of fuel leakage which can be caused by, e.g., a crack made by a vehicle side collision.

To meet this demand, it is conceivable, for example, to enhance the stiffness of a fuel supply pipe by increasing the wall thickness of the fuel supply pipe. However, this is not preferable as measures to enhance the stiffness because such an increase in the wall thickness will increase the weight of the whole fuel supply pipe and the manufacturing costs. In view of this, studies are being conducted on the prevention of fuel leakage that a vehicle side collision can causes, not by merely enhancing the stiffness by increasing the wall thickness of a fuel supply pipe, but by imparting high stiffness to the joint portion between a fuel supply pipe body and a short cylindrical member that form a fuel supply pipe. In addition, to protect the environment, corrosive fuel oil of vegetable origin and mixtures of such fuel oil of vegetable origin and ordinary fossil fuel oil have been used more widely as the fuel of vehicles in recent years. Therefore, studies have been started on how to improve the anti-corrosion performance of not only the outer peripheral surface of a fuel supply pipe, but also the inner peripheral surface with which a fuel comes into direct contact.

For example, Japanese Unexamined Patent Publication No. 2002-370552 (see, paragraph 0012) discloses a fuel supply pipe which is assembled by joining a cap retainer joint portion of a cap retainer (a short cylindrical member) to a conduit joint portion of a conduit (a fuel supply pipe body). The joint angle that the conduit forms with the cap retainer can be altered to improve the joint strength of the joint portion between the cap retainer and the conduit. Specifically, the cap retainer joint portion is configured as a compound surface having different normal line directions, whereas the conduit joint portion is configured as a band surface conforming in shape to the cap retainer joint portion. The cap retainer joint portion is brought into line contact or plane contact with the conduit joint portion, and the cap retainer is joined to the conduit within the range of the conduit joint portion.

This patent document merely discloses that the cap retainer is joined and brazed to the conduit by laser beam welding or arc welding, and includes no descriptions about specific techniques of the laser beam welding.

According to Japanese Unexamined Patent Publication No. 2012-091534 (see, paragraph 0023), a fuel filler pipe body made of a plated steel sheet has one end connected to a fuel tank, and a short cylindrical member made of stainless steel is fitted into the other end of the pipe body. The fitting portion is continuously brazed by MIG welding, thereby assembling a fuel filler pipe.

However, this patent document merely discloses that the pipe body is brazed to the short cylindrical member by MIG welding. This patent document merely describes that the pipe body may be brazed to the short cylindrical member by laser beam welding, plasma welding, or TIG welding, and that these components may be joined to each other by any process other than the forgoing processes, as long as the process is continuous welding.

Thus, none of the above patent documents specifically refer to how a fuel supply pipe body and a short cylindrical member that form a fuel supply pipe are joined together, taking into consideration the stiffness and anti-corrosion performance of the joint portion therebetween.

BRIEF SUMMARY

In view of the forgoing background, it is therefore an object of the present invention to provide a method for assembling a fuel supply pipe in which the joint portion between a pipe body and a short cylindrical member has high stiffness and good anti-corrosion performance, and a fuel supply pipe assembly device for assembling the fuel supply pipe.

To achieve this object, according to the present invention, while a laser beam in a defocused state is being emitted to impinge on an overlapping portion of first and second cylindrical members that form a fuel supply pipe, the first and second cylindrical members are rotated through two complete turns or more relative to the laser beam about a cylinder center line.

Specifically, the present invention relates to a method for assembling a fuel supply pipe, including: joining one end of a first cylindrical member of which the other end is provided with a fuel supply port to one end of a second cylindrical member of which the other end is joined to a fuel tank, thereby assembling the fuel supply pipe. The method is provided with the following measures to achieve the object.

Specifically, according to a method of a first aspect of the present invention, one of the first and second cylindrical members is fitted into the other one such that the fitted inner one is positioned inside the outer one, and the first and second cylindrical members are held such that an end portion of the outer one overlaps an outer peripheral surface of the inner one. While a laser beam in a defocused state is being emitted to impinge on the end portion of the outer one in an overlapping portion of the first and second cylindrical members, the first and second cylindrical members are rotated through one complete turn relative to the laser beam about a cylinder center line, thereby melting an entire periphery of the end portion of the outer one, and subsequently, while the laser beam in a defocused state is being emitted to impinge on the melted end portion of the outer one, the first and second members are rotated through at least one further complete turn relative to the laser beam about the cylinder center line, thereby joining by welding the end portion of the outer one to the outer peripheral surface of the inner one.

A second aspect of the present invention is an embodiment of the first aspect. In the second aspect, the first cylindrical member is implemented as the inner one, the second cylindrical member is implemented as the outer one, and the first cylindrical member has a plated layer formed on each of inner and outer peripheral surfaces thereof.

A third aspect of the present invention is an embodiment of the first aspect. In the third aspect, the first cylindrical member is implemented as the outer one, the second cylindrical member is implemented as the inner one, and the second cylindrical member has a plated layer formed on each of inner and outer peripheral surfaces thereof.

A fourth aspect of the present invention is an embodiment of any one of the first to third aspects. In the fourth aspect, the emitted laser beam is kept in the same defocused state when the laser beam is emitted to melt the entire periphery of the end portion of the outer one and when the laser beam is emitted to join by welding the outer one to the inner one.

A fifth aspect of the present invention is an embodiment of the first aspect. In the fifth aspect, a rotation jig which includes a rotation shaft with an outside shape fitting with an inner peripheral surface of the first cylindrical member is provided, and the rotation shaft is inserted into the first cylindrical member and rotated, thereby rotating the first and the second cylindrical members in an integrated manner.

A sixth aspect of the present invention is an embodiment of the first aspect. In the sixth aspect, the inner one has a step between a portion to be fitted into the outer one and a portion not to be fitted such that an outside diameter of the portion not to be fitted is larger than that of the portion to be fitted, and the step is designed such that the end portion of the outer one is kept in contact with or close to the step.

The present invention also relates to a fuel supply pipe assembly device for assembling a fuel supply pipe by joining one end of a first cylindrical member of which the other end is provided with a fuel supply port to one end of a second cylindrical member of which the other end is joined to a fuel tank. The device is provided with the following measures to achieve the object.

Specifically, according to a seventh aspect of the present invention, the device includes: a rotator which has a rotation shaft; a laser beam emitter which is capable of continuously emitting a laser beam; and a controller which includes a defocusing control section that displaces a position on which the laser beam emitted by the laser beam emitter impinges and thereby defocuses the laser beam by a predetermined amount, and which controls rotation of the rotation shaft of the rotator and laser beam emission by the laser beam emitter. One of the first and second cylindrical members is fitted into the other one such that the fitted inner one is positioned inside the outer one and an end portion of the outer one overlaps an outer peripheral surface of the inner one, and the thus arranged first and second cylindrical members are then set onto the rotation shaft. The controller controls the rotator and the laser beam emitter such that, while rotating the first and second cylindrical members through one complete turn about a cylinder center line, the controller makes the laser beam that is in a defocused state impinge on the end portion of outer one in the overlapping portion of the first and second members, thereby melting the end portion, and while rotating the first and second cylindrical members through at least one further complete turn, the controller makes the laser beam that is in a defocused state impinge on the melted end portion of the outer one, thereby joining by welding the melted end portion of the outer one to the outer peripheral surface of the inner one.

An eighth aspect of the present invention is an embodiment of the seventh aspect. In the eight aspect, the device further includes: a displacement amount detector which detects, when the first and second cylindrical members are rotated by the rotator, a displacement amount by which the end portion of the outer one is displaced in a rotation axis direction with respect to the position on which the laser beam impinges; and a position adjuster which is capable of adjusting, in the rotation axis direction, the position on which the laser beam emitted by the laser beam emitter impinges, wherein the controller is connected to the position adjuster, and controls the position adjuster such that the position on which the laser beam impinges is adjusted in accordance with the displacement amount detected by the displacement amount detector.

A ninth aspect of the present invention is an embodiment of the eighth aspect. In the eighth aspect, the position adjuster has a mirror which reflects, toward the end portion of the outer one, the laser beam emitted by the laser beam emitter, and the position adjuster adjusts the position on which the laser beam impinges by varying an inclination angle of the mirror.

According to the first to third, and seventh aspects of the present invention, while a laser beam in a defocused state is being emitted to impinge on the end portion of the outer one, the first and second cylindrical members are rotated, which results in that the outer peripheral edge portion of the end portion of the outer one is melted and collapsed. Consequently, the welded area between the outer one and the inner one is increased, and the gap between the outer one and the inner one is filled, thereby increasing weld strength. In addition, according to the second and third aspects of the present invention, in particular, since the heat generated in an initial stage of the laser beam emission removes the plated layer from the outer peripheral surface of the inner one, porosity (weld defects such as blowholes formed in a welded metal and pits in a worm shape reaching a surface) which can be produced due to vaporization of the plated material during the welding is reduced. Further, since the laser beam that is in a defocused state impinges on the entire periphery of the end portion of the outer one, the end portion is strongly welded to the outer peripheral surface of the inner one. At the same time, since the laser beam in the defocused state applies a small amount of heat to the inner one and is not allowed to pass through the inner one, the plated layer on the inner peripheral surface of the inner one is not made to peel off. Thus, the present invention allows for fabricating the fuel supply pipe that has high anti-corrosion performance, without carrying out intricate anti-corrosion treatments (surface treatments such as plating and coating) to the inner peripheral surface of the fuel supply pipe after assembling the first and second cylindrical members.

According to the fourth aspect, since the defocused state of the laser beam is not altered in the process of assembling the first and second cylindrical members, good workability and high productivity are provided. In particular, if the positon on which the laser beam impinges is not moved between the first and second turns of the first and second cylindrical members, the productivity will be further increased.

According to the fifth aspect, since the first and second cylindrical members are rotated in an integrated manner, with the rotation shaft of the rotation jig inserted in the first cylindrical member, the first and second cylindrical members are stably rotated and the orbit of the end portion of the outer one is not easily displaced in the rotation axis direction during the rotation, which ensures reliable joint between the first and second cylindrical members. In addition, during the welding, since the rotation shaft is in contact with the inner peripheral surface of the first cylindrical member, even if the laser beam applies a large amount of irradiation heat to the first and second cylindrical members, the inserted rotation shaft reduces heat distortion of the first and second cylindrical members.

According to the sixth aspect of the present invention, due to the presence of the step, the outer peripheral surface of the inner one is positioned close to, or brought into contact with, the end portion of the outer one. This allows for eliminating or minimizing the gap between the outer one and the outer peripheral surface of the inner one. Thus, the sixth aspect allows for reliably welding the end portion of the outer one to the outer periphery of the inner one.

According to the eighth aspect of the present invention, even if one of the first and second cylindrical members that has been inserted into the other one is slightly oblique with respect to the other one or even if the end portion of the outer one has been displaced, due to a dimension error or other causes, in the rotation axis direction with respect to the position on which the laser beam impinges, it is ensured that the laser beam impinges on the end portion of the outer one. This allows for further increasing the reliability of the joint between the first and second cylindrical members.

According to the ninth aspect of the present invention, a small movement of the mirror results in a large movement of the position on which the laser beam impinges, which enables the position on which the laser beam impinges to follow immediately the end portion of the outer one. Thus, the melting position is fine adjusted, and consequently, it is ensured that the first and second cylindrical members are reliably joined together.

DETAILED DESCRIPTION OF VARIOUS EMBODIMENTS

Embodiments of the present invention will be described below in detail with reference to the drawings. Note that the following embodiments are merely preferred examples in nature.

First Embodiment

Figure 1:
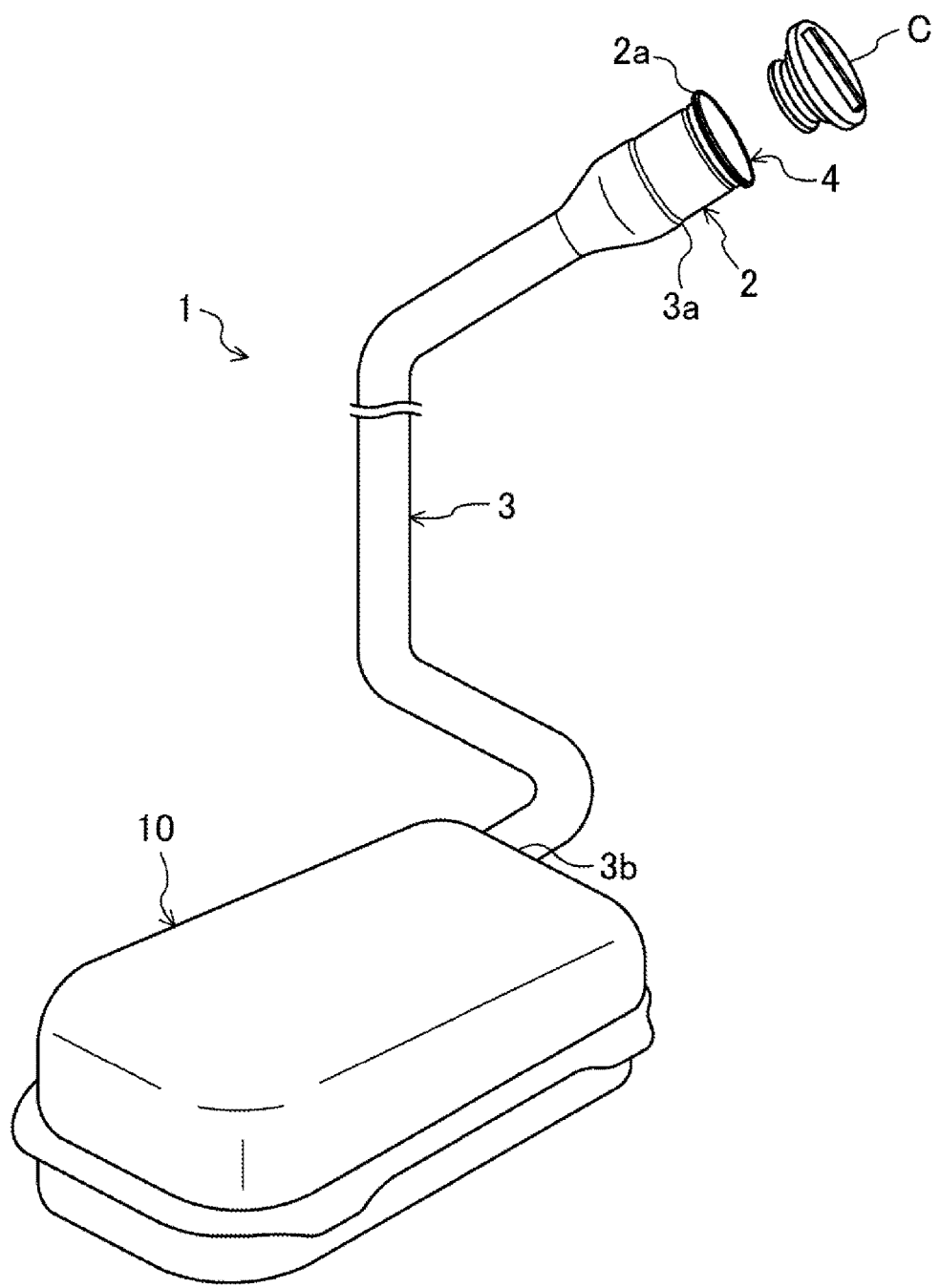
FIG. 1 is a perspective view showing a fuel supply pipe according to a first embodiment of the present invention, a fuel tank to which the fuel supply pipe is joined, and a supply port cap for closing a fuel supply port.

FIG. 1 shows a fuel supply pipe 1 according to a first embodiment of the present invention. The fuel supply pipe 1 serves as a passage through which a fuel to be supplied to a fuel tank 10 of a vehicle passes. The fuel supply pipe 1 includes a fuel supply pipe body 3 (a second cylindrical member) which is in a long and substantially cylindrical shape and of which one end portion (hereinafter referred to as the end portion 3b) is joined to the fuel tank 10. The fuel supply pipe 1 also includes a short cylindrical member 2 (a first cylindrical member) which is in a substantially cylindrical shape and of which one end portion (hereinafter referred to as the end portion 2a) is provided with a fuel supply port 4. The other end portion (hereinafter referred to as the end portion 2b) of the short cylindrical member 2 is joined to the other end portion (hereinafter referred to as the end portion 3a) of the pipe body 3.

The pipe body 3 is comprised of a steel pipe (an electro-resistance-welded tube) which is formed by welding a seam of a cylindrically rolled steel plate that has a plated layer formed on both surfaces thereof and a uniform wall thickness. In the pipe body 3, a portion close to the end portion 3a has an increased diameter.

Specifically, the pipe body 3 is a steel pipe that has a wall thickness of about 0.8 mm to 1.0 mm and a plated layer formed on each of its inner and outer peripheral surfaces by nickel zinc plating or hot dip galvanizing.

If the fuel supply pipe 1 to be fabricated is not required to have high anti-corrosion performance of the outer surface, the steel pipe forming the pipe body 3 may be made of a material corresponding to STKM11A or STKM12A of Japanese Industrial Standards (JIS). Specifically, a plated steel pipe which is made of a material corresponding to STKM11A and has a plated layer formed on each of its inner and outer peripheral surfaces by hot dip galvanizing is applicable as the pipe body 3, for example. Such a plated steel pipe is available from, e.g., Maruichi Steel Tube Ltd. If the fuel supply pipe 1 to be fabricated is required to have high anti-corrosion performance of the outer surface, the steel pipe forming the pipe body 3 may be made of a material corresponding to SUS429, SUS430, SUS430LX, SUS430J1L, SUS403LX, SUS434, SUS436L, SUS436J1L, SUS443J1, or SUS444 of JIS. For example, a plated steel pipe which is made of NSS439 (corresponding to SUS430LX of JIS) and has a plated layer formed on each of its outer and inner peripheral surfaces by nickel zinc alloy plating (electroplating) is applicable as the pipe body 3. Such a plated steel pipe is available from, e.g., Nisshin Steel Co., Ltd.

Figure 2:
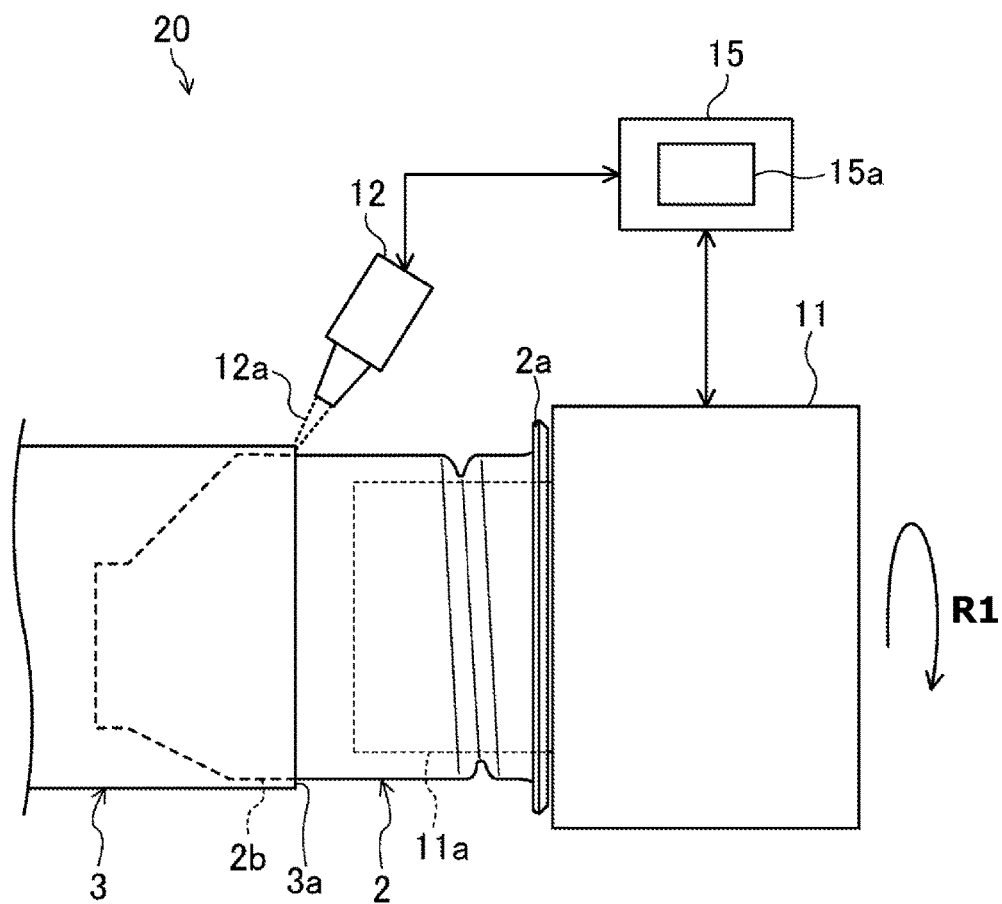
FIG. 2 is an enlarged fragmentary view schematically showing how a pipe body and a short cylindrical member of the fuel supply pipe shown in FIG. 1 are welded together.

The short cylindrical member 2 is formed by press-forming a steel plate having a plated layer formed on both surfaces thereof, and has a threaded portion into which a supply port cap C is threadedly fitted (see FIG. 2). The fuel supply port 4 can be opened or closed by fitting or removing the supply port cap C. The fuel supply port 4 is also designed such that the nozzle of a fuel gun (not shown) can be inserted thereinto and removed therefrom.

Specifically, the short cylindrical member 2 has a wall thickness of about 1.2 mm to 1.6 mm. The short cylindrical member 2 is formed by press-forming, into a short cylinder, a cold-rolled steel plate having a plated layer previously formed on both surfaces thereof by electro-galvanizing or electroless plating of nickel. Although the short cylindrical member 2 is comprised of such a short cylinder formed by press-forming a cold-rolled steel plate that has previously-formed plated layers, a short cylinder which is formed by press-forming a cold-rolled steel that is devoid of plated layers, and of which the outer and inner peripheral surfaces are then subjected to electro-galvanizing or electroless plating of nickel may be used as the short cylindrical member 2.

The fuel supply pipe 1 is assembled by a fuel supply pipe assembly device 20 according to an embodiment of the present invention.

As shown in FIG. 2, the fuel supply pipe assembly device 20 includes a rotation jig 11 (a rotator) onto which the pipe body 3 and the short cylindrical member 2 having the end portion 2b thereof fitted into the end portion 3a of the pipe body 3 can be set. The device 20 further includes a laser device 12 (a laser beam emitter) which is capable of continuously emitting a laser beam 12a, and a control section 15 (a controller) which is connected to the rotation jig 11 and the laser device 12 and outputs operation signals to the jig 11 and the device 12. The control section 15 is configured to control the rotation of the rotation jig 11 and the emission of the laser beam 12a by the laser device 12.

The rotation jig 11 has a rotation shaft 11a which extends in the horizontal direction and rotates (see direction of rotation R1) in conjunction with the rotation of a servomotor (not shown). The rotation shaft 11a is inserted into the short cylindrical member 2 which is overlapped by the pipe body 3. When the inserted rotation shaft 11a is rotated, the pipe body 3 and the short cylindrical member 2 are rotated in an integrated manner about the cylinder center line (a horizontal line) of their overlapping portion.

The control section 15 includes a defocusing control section 15a which displaces the position on which the laser beam 12a emitted by the laser device 12 impinges, and thereby defocuses the laser beam 12a by a predetermined amount. The term "defocusing" means to displace the focus of the laser beam 12a in the emission direction of the laser beam 12a. For example, if the laser beam 12a being in focus has an impingement diameter of about 0.6 mm, this diameter is varied to be about 0.8 mm by the defocusing.

The pipe body 3 and the short cylindrical member 2 that has been arranged such that the end portion 3a of the pipe body 3 overlaps the outer peripheral surface of the short cylindrical member 2 are set onto the rotation shaft 11a. The control section 15 then controls the rotation jig 11 and the laser device 12 to make the laser beam 12a that is in a defocused state impinge on the end portion 3a (the outer peripheral edge portion), while rotating the pipe body 3 and the short cylindrical member 2 through one complete turn about the cylinder center line of the overlapping portion, thereby melting the end portion 3a. Hereinafter, the melted end portion 3a is referred to as the end portion 3a1.

The control section 15 subsequently controls the rotation jig 11 and the laser device 12 to make the laser beam 12a in the defocused state impinge on the melted end portion 3a1, while rotating the pipe body 3 and the short cylindrical member 2 through one complete turn about the cylinder center line. Consequently, the end portion 3a1 is joined by welding to the outer peripheral surface of the short cylindrical member 2.

Next, how the pipe body 3 and the short cylindrical member 2 are joined together is described with reference to FIGS. 2 to 4. Hatch of a cross section is omitted from FIGS. 3 and 4.

First, the end portion 2b of the short cylindrical member 2 is relatively fitted into the end portion 3a of the pipe body 3. While the outer peripheral surface of the short cylindrical member 2 is kept overlapped by the end portion 3a of the pipe body 3, the rotation shaft 11a of the rotation jig 11 is inserted into the short cylindrical member 2 through the end portion 2b.

Thereafter, the laser beam 12a defocused by the defocusing control section 15a is emitted toward the outer peripheral edge portion of the end portion 3a of the pipe body 3. At this time, the laser beam 12a is preferably emitted toward the outer peripheral edge portion of the end portion 3a slightly obliquely with respect to the direction perpendicular to the rotation axis direction of the rotation jig 11 that retains and rotates the pipe body 3 and the short cylindrical member 2.

Next, while the laser device 12 is emitting the laser beam 12a that is in the defocused state and impinges on the outer peripheral edge portion of the end portion 3a of the pipe body 3, the rotation jig 11 rotates the pipe body 3 and the short cylindrical member 2 through one complete turn in an integrated manner. If a screw portion which can be threadedly fitted with the threaded portion on the inner peripheral surface of the short cylindrical member 2 is formed on the outer peripheral surface of the rotation shaft 11a of the rotation jig 11, the short cylindrical member 2 will be more easily set to the rotation jig 11. The screw portion will also ensure that the pipe body 3 and the short cylindrical member 2 are rotated together with the rotation shaft 11a.

Figure 3:
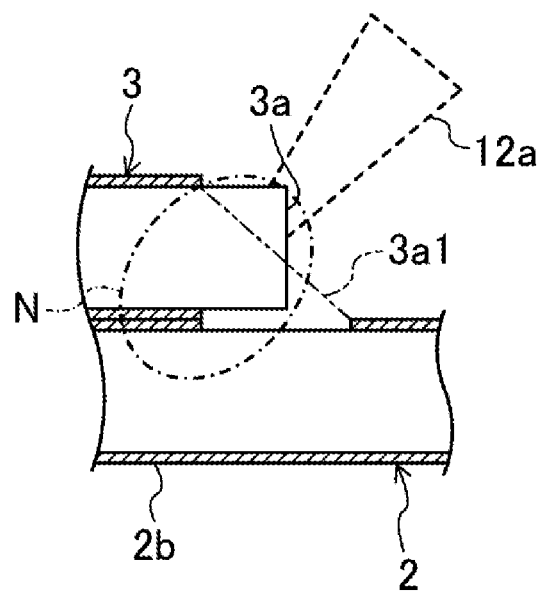
FIG. 3 is an enlarged cross-sectional view of a portion of FIG. 2, and shows melting resulting from a first turn of the pipe body and the short cylindrical member.
Figure 4:
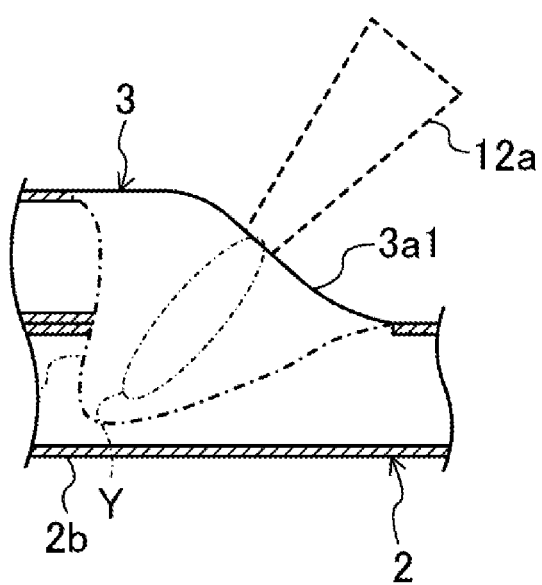
FIG. 4 is an enlarged cross-sectional view of a portion of FIG. 2, and shows the pipe body and the short cylindrical member that are welded after a second or subsequent turn.

This first complete turn brings a heat-influenced area N around the end portion 3a of the pipe body 3 into a state as shown in FIG. 3. Consequently, the end portion 3a of the pipe body 3 is melted, and the galvanized layer formed on the outer peripheral surface of the short cylindrical member 2 is removed. At the same time, the end portion 3a is collapsed to spread along the outer peripheral surface of the short cylindrical member 2, and thereby turns into the melted end portion 3a1.

The pipe body 3 and the short cylindrical member 2 that are in this state are rotated through another complete turn in an integrated manner. During this second turn, the laser beam 12a that is in the same defocused state as of the first turn impinges on the same position as that of the first turn. Consequently, the heat-influenced area N around the melted end portion 3a1 of the overlapping pipe body 3 and the outer peripheral surface of the short cylindrical member 2 enters the state as shown in FIG. 4. As a result, the pipe body 3 and the short cylindrical member 2 are welded together. In FIG. 4, reference character Y denotes a high energy region.

Thereafter, the pipe body 3 and the short cylindrical member 2 are rotated through another complete turn in an integrated manner. During this third turn, the laser beam 12a that is in the same defocused state as the second turn impinges on the same position as that of the second turn. This makes the welded portion expand further deeply, and increases the weld strength significantly.

The above-stated defocused state is described, in terms of heat input for example, as a state where a heat input is suitable to melt, and collapse the end portion 3a during the first turn of the pipe body 3 and the short cylindrical member 2, and where the heat input enables the melted end portion 3a1 to adhere to the outer peripheral surface of the short cylindrical member 2 and the heat input does not allow the laser beam 12a to pass through the short cylindrical member 2 during the second and third turns of the pipe body 3 and the short cylindrical member 2. Therefore, during the second and third turns of the pipe body 3 and the short cylindrical member 2, the laser beam 12a is not allowed to pass through the short cylindrical member 2, which prevents the galvanized layer on the inner peripheral surface of the short cylindrical member 2 from adversely peeling off.

As can be seen from the forgoing, according to the first embodiment of the present invention, the pipe body 3 and the short cylindrical member 2 are rotated while the laser beam 12a that is in the defocused state is being emitted to impinge on the end portion 3a of the pipe body 3. Consequently, the outer peripheral edge portion of the end portion 3a of the pipe body 3 is melted and collapsed, which results in that the welded area between the pipe body 3 and the short cylindrical member 2 is increased and the gap between the pipe body 3 and the short cylindrical member 2 is filled. The weld strength is thus increased. In addition, since the heat generated in an initial stage of the emission of the laser beam 12a removes the galvanized layer from the outer peripheral surface of the short cylindrical member 2, porosity which can be produced due to vaporization of the plated zinc during the welding is reduced. Further, since the laser beam 12a that is in the defocused state impinges on the entire periphery of the end portion 3a1, the end portion 3a1 of the pipe body 3 is strongly welded to the outer peripheral surface of the short cylindrical member 2. At the same time, since the laser beam 12a in the defocused state applies a small amount of heat to the short cylindrical member 2 and is not allowed to pass through the short cylindrical member 2, the galvanized layer on the inner peripheral surface of the short cylindrical member 2 is not made to peel off. Thus, the present inversion allows for fabricating the fuel supply pipe 1 that has high anti-corrosion performance, without carrying out intricate anti-corrosion treatments (surface treatments such as plating and coating) on the inner peripheral surface of the fuel supply pipe 1 after assembling the pipe body 3 and the short cylindrical member 2.

Further, since the defocused state of the laser beam is not altered in the process of assembling the pipe body 3 and the short cylindrical member 2, the present invention provides good workability and high productivity.

Furthermore, since the pipe body 3 and the short cylindrical member 2 are rotated in an integrated manner with the rotation shaft 11a of the rotation jig 11 inserted in the short cylindrical member 2, the pipe body 3 and the short cylindrical member 2 are stably rotated and the orbit of the end portion 3a of the pipe body 3 is not easily displaced in the rotation axis direction during the rotation, which ensures reliable joint between the pipe body 3 and the short cylindrical member 2.

In addition, during the welding, since the rotation shaft 11a is in contact with the inner peripheral surface of the short cylindrical member 2, even if the laser beam 12a applies a large amount of irradiation heat to the pipe body 3 and the short cylindrical member 2, the rotation shaft 11a reduces heat distortion of the pipe body 3 and the short cylindrical member 2.

Second Embodiment

Figure 5:
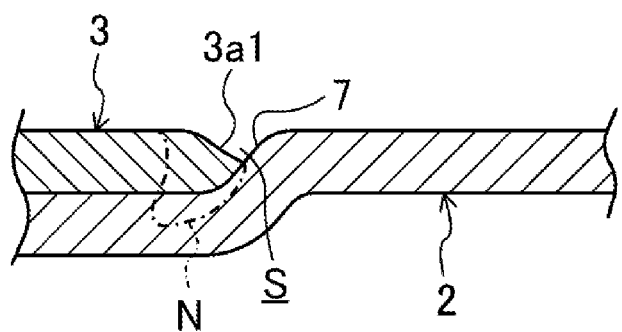
FIG. 5 corresponds to FIG. 3, and shows a fuel supply pipe according to a second embodiment of the present invention.

A second embodiment of the present invention will be described with reference to FIG. 5. The second embodiment is partly different from the first embodiment. The difference will be described below, and the description of the common components and features is not repeated.

The second embodiment is different from the first embodiment in the shape of the short cylindrical member 2. Specifically, the short cylindrical member 2 of the second embodiment has, near the end portion 2b, a portion which has an outside diameter corresponding to the inside diameter of the fuel supply pipe body 3. The short cylindrical member 2 also has a portion which has, due to the presence of a step 7 formed between the forgoing portion and the end portion 2a, an outside diameter larger than the inside diameter of the pipe body 3. In other words, the short cylindrical member 2 has the step 7 between the portion to be fitted into the pipe body 3 and the portion not to be fitted so that the outer diameter of the portion not to be fitted is larger than that of the portion to be fitted.

The step 7 is designed such that the end portion 3a of the pipe body 3 is in contact with or close to the step 7.

Thus, according to the second embodiment of the present invention, due to the presence of the step 7, the outer peripheral surface of the short cylindrical member 2 is positioned close to, or brought into contact with, the end portion 3a of the pipe body 3. This allows for eliminating or minimizing the gap (see space S) between the end portion 3a of the pipe body 3 and the outer peripheral surface of the short cylindrical member 2. Thus, the second embodiment of the present invention allows for reliably welding the end portion 3a (the end portion 3a1) of the pipe body 3 to the outer peripheral surface of the short cylindrical member 2.

Third Embodiment

Figure 6:
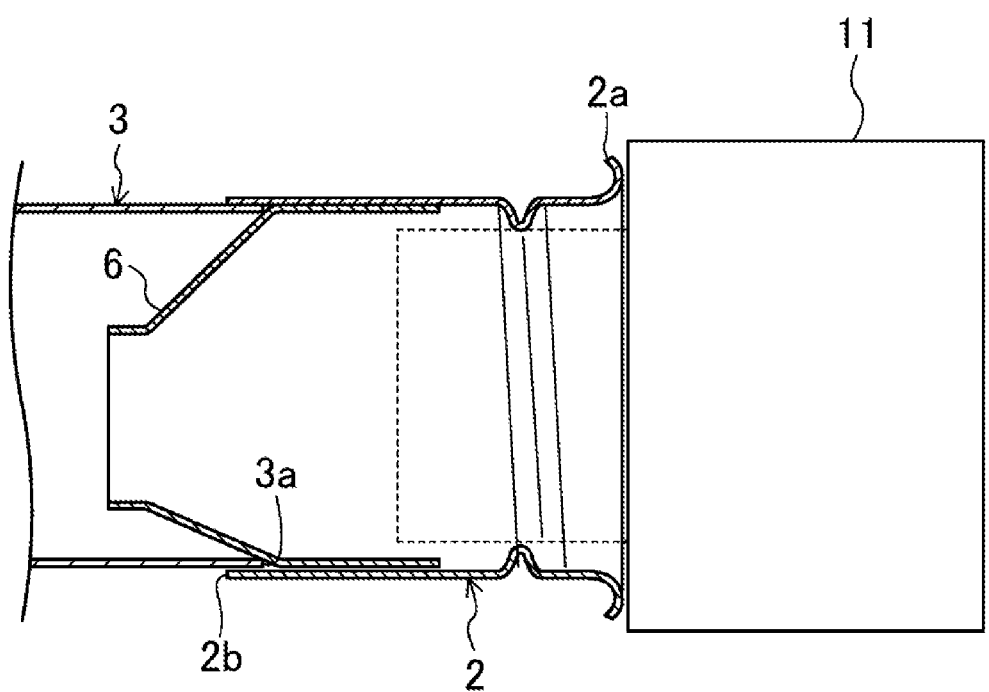
FIG. 6 is an enlarged fragmentary cross-sectional view of a fuel supply pipe according to a third embodiment of the present invention.

A third embodiment of the present invention will be described below with reference to FIG. 6. The third embodiment is partly different from the first embodiment. The difference will be described below, and the description of the common components and features is not repeated.

The fuel supply pipe 1 of the third embodiment is configured such that the end portion 3a of the fuel supply pipe body 3 is inserted into the end portion 2b of the short cylindrical member 2. In other words, the third embodiment is different from the first embodiment in the position of the pipe body 3 relative to the short cylindrical member 2. Specifically, in this embodiment, the end portion 2b of the short cylindrical member 2 is melted to adhere to the outer peripheral surface of the pipe body 3. Since the state of the welded portion between the pipe body 3 and the short cylindrical member 2 of the third embodiment is the same as or similar to that of the first embodiment, the welded portion is not described in detail here.

Inside the short cylindrical member 2, an inner cylindrical member 6 is provided. The inner cylindrical member 6 may be integrated with the short cylindrical member 2, or may be provided separately, as in this third embodiment. The inner cylindrical member 6 described herein is an example of the separately-provided type. Naturally, the inner cylindrical member 6 may be provided separately from the short cylindrical member 2 also in the first embodiment.

The pipe body 3 of the third embodiment is made of a galvanized steel plate, and the short cylindrical member 2 is made of a stainless steel plate. As in the first embodiment, this third embodiment also enables strong weld between the outer peripheral surface of the pipe body 3 and the end portion 2b of the short cylindrical member 2.

Specifically, the short cylindrical member 2 is formed by press-forming, into a short cylinder, a ferritic stainless steel plate having a wall thickness of about 1.2 mm to 1.6 mm (for example, a steel plate made of a material corresponding to SUS429, SUS430, SUS430LX, SUS430J1L, SUS434, SUS436L, SUS436J1L, SUS443J1, and SUS444 of JIS).

The short cylindrical member 2 of the third embodiment may have a shape similar to that of the second embodiment. Further, as in the first embodiment, each of the pipe body 3 and the short cylindrical member 2 of the third embodiment may be made of a galvanized steel plate. Conversely, the short cylindrical member 2 of the first embodiment may be made of a stainless steel plate, instead of the galvanized steel plate. The plating in the present invention is not limited to galvanization, but may be other types of plating.

Fourth Embodiment

Figure 7:
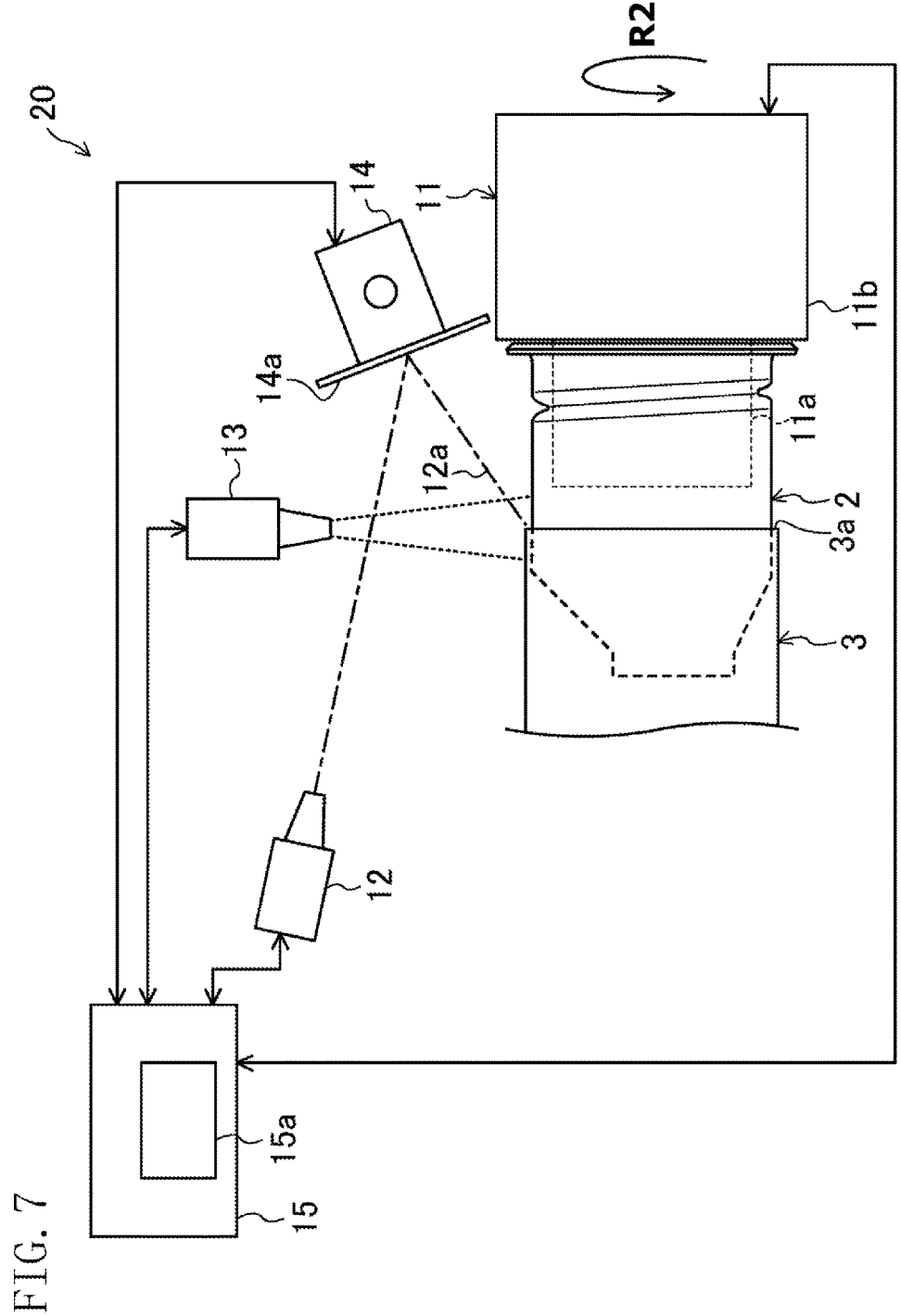
FIG. 7 is a schematic view showing a configuration of a fuel supply pipe assembly device according to a fourth embodiment of the present invention.

A fourth embodiment of the present invention will be described below with reference to FIG. 7. A fuel supply pipe assembly device of the fourth embodiment is partly different from the fuel supply pipe assembly device 20 of the first embodiment. The difference will be described below, and the description of the common components and features is not repeated.

A displacement amount sensor 13 (a displacement amount detector) is provided near the rotation jig 11 of the fourth embodiment. The displacement amount sensor 13 is configured to detect an amount of displacement by which the end portion 3a of the fuel supply pipe body 3 is displaced in the rotation axis direction with respect to the position on which a laser beam 12a impinges when the pipe body 3 and the short cylindrical member 2 are rotated by the rotation jig 11.

Further, a reflection mechanism 14 (a position adjuster) which has a mirror 14a is disposed beside the displacement amount sensor 13. The mirror 14a reflects the laser beam 12a emitted by the laser device 12 toward the end portion 3a of the pipe body 3. The reflection mechanism 14 is configured to adjust the position on which the laser beam 12a impinges by varying the angle of inclination of the mirror 14a.

The control section 15 of this embodiment is connected also to the displacement amount sensor 13 and the reflection mechanism 14. The control section 15 controls the reflection mechanism 14 to vary the angle of inclination of the mirror 14a such that the position on which the laser beam 12a impinges is adjusted in accordance with the displacement amount detected by the displacement amount sensor 13.

Thus, according to the fourth embodiment of the present invention, even if the short cylindrical member 2 that has been inserted into the pipe body 3 is slightly oblique with respect to the pipe body 3 or even if the end portion 3a of the pipe body 3 is displaced, due to a dimension error or other causes, in the rotation axis direction with respect to the position on which the laser beam 12a impinges, it is ensured that the laser beam 12a impinges on the end portion 3a of the pipe body 3. This allows for further increasing the reliability of the joint between the pipe body 3 and the short cylindrical member 2.

Further, a small movement of the mirror 14a results in a large movement of the position on which the laser beam 12a impinges, which enables the position on which the laser beam 12a impinges to follow instantaneously the end portion 3a of the pipe body 3. Thus, the melting position is fine-adjusted, and consequently, it is ensured that the pipe body 3 is reliably joined to the short cylindrical member 2.

In the first to fourth embodiments, the fuel supply pipe body 3 and the short cylindrical member 2 are welded together with the laser beam 12a that is in the same defocused state under the unchanged emission conditions through the first to third turns. However, in accordance with the differences in the material and the thickness between the pipe body 3 and the short cylindrical member 2, the emission conditions (for example, a laser output and a moving speed of the laser beam), the trajectory of the position on which the laser beam impinges, and other conditions may be changed from the first turn to the second and subsequent turns of the pipe body 3 and the short cylindrical body 2. Also in such a case, the emitted laser beam 12a is kept in a defocused state, and not brought into focus.

During the period from the start to the end of welding, the pipe body 3 and the short cylindrical member 2 are rotated (see direction of rotation R2) through three complete turns while the laser beam 12a is impinging. If needed, the welding may be completed in two complete turns (one complete turn for each of melting and adhering). Alternatively, the welding may be completed in four or more complete turns (one complete turn for melting and three or more complete turns for adhering).

The present invention is suitable for a method for assembling a fuel supply pipe serving as a passage through which a fuel such as gasoline to be supplied to a vehicle fuel tank passes, and a fuel supply pipe assembly device for assembling the fuel supply pipe.

That which is claimed:

1. A method for assembling a fuel supply pipe, the method comprising the step of:
    joining one end of a first cylindrical member of which the other end is provided with a fuel supply port to one end of a second cylindrical member of which the other end is joined to a fuel tank, thereby assembling the fuel supply pipe, the first cylindrical member having a plated layer formed on an outer peripheral surface thereof, and the second cylindrical member having a plated layer formed on an outer peripheral surface thereof,
    wherein the joining step comprises the sub-steps of:
        fitting one of the first and second cylindrical members into the other one such that an inner one of the first and second cylindrical members is positioned at least partially inside an outer one of the first and second cylindrical members,
        holding the first and second cylindrical members such that an end portion of the outer one overlaps an outer peripheral surface of the inner one,
        rotating, while emitting a laser beam in a defocused state to impinge on the end portion of the outer one, the first and second cylindrical members through one complete turn relative to the laser beam about a cylinder center line such that an entire periphery of the end portion of the outer one is melted in an overlapping portion of the first and second cylindrical members,
        subsequently, rotating, while emitting the laser beam in a defocused state to impinge on the melted end portion of the outer one, the first and second cylindrical members through at least one further complete turn relative to the laser beam about the cylinder center line such that the end portion of the outer one is coupled to the outer peripheral surface of the inner one by welding,
    and
    removing, in the melting of the entire periphery of the end portion of the outer one, a portion of the plated layer residing on a portion of the inner one near the end portion of the outer one.

2. The method of claim 1, wherein:

the first cylindrical member is implemented as the inner one,
the second cylindrical member is implemented as the outer one,
the first cylindrical member has the plated layer formed on the outer peripheral surface thereof; and
the first cylindrical member has another plated layer formed on an inner peripheral surface thereof.

3. The method of claim 1, wherein:
the first cylindrical member is implemented as the outer one,
the second cylindrical member is implemented as the inner one,
the second cylindrical member has the plated layer formed on the outer peripheral surface thereof; and
the first cylindrical member has another plated layer formed on an inner peripheral surface thereof.

4. The method of claim 1, wherein the emitted laser beam is kept in the same defocused state when the laser beam is emitted to melt the entire periphery of the end portion of the outer one and when the laser beam is emitted to join by welding the outer one to the inner one.

5. The method of claim 1, wherein:
a rotation jig which includes a rotation shaft with an outside shape fitting with an inner peripheral surface of the first cylindrical member is provided, and
the rotation shaft is inserted into the first cylindrical member and rotated, thereby rotating the first and the second cylindrical members in an integrated manner.

6. The method of claim 1, wherein:
the inner one has a step between a portion to be fitted into the outer one and a portion not to be fitted such that an outside diameter of the portion not to be fitted is larger than that of the portion to be fitted, and
the step is designed such that the end portion of the outer one is kept in contact with or close to the step.

* * * * *